United States Patent [19]
Umemura

[11] Patent Number: 5,926,058
[45] Date of Patent: Jul. 20, 1999

[54] APERTURE COMPENSATION CIRCUIT AND RGB MONITOR

[75] Inventor: Shunji Umemura, Chiba, Japan

[73] Assignee: Sony Corporation, Tokyo, Japan

[21] Appl. No.: 08/944,962

[22] Filed: Oct. 7, 1997

[30] Foreign Application Priority Data

Oct. 14, 1996 [JP] Japan ................................ P08-291111

[51] Int. Cl.[6] ........................................................ G06G 7/12
[52] U.S. Cl. ............................................ 327/362; 358/532
[58] Field of Search .................................... 327/362, 538; 348/222, 252, 280, 300, 676, 707; 358/532, 504, 515–518

[56] References Cited

U.S. PATENT DOCUMENTS

| | | | |
|---|---|---|---|
| 5,150,206 | 9/1992 | Roberts | 358/30 |
| 5,493,340 | 2/1996 | Kim | 348/569 |
| 5,541,649 | 7/1996 | Yamamoto et al. | 348/223 |
| 5,751,451 | 5/1998 | Ogoshi et al. | 358/527 |
| 5,828,777 | 10/1998 | Suzuki | 382/135 |

*Primary Examiner*—My-Trang Nu Ton
*Attorney, Agent, or Firm*—Jay H. Maioli

[57] ABSTRACT

A aperture compensation circuit which provides improvement in picture quality when a multi-media image is displayed and an RGB monitor employing the same includes a sharpness circuit provided between input terminals and a preamplifier. A lowest value detection circuit of the sharpness circuit detects a lowest value signal from among R, G and B signals supplied from the input terminals, and a differentiation circuit differentiates the lowest value signal to produce a differentiation signal. A slice circuit slices a component of the differentiation signal which corresponds to a portion at which a change from black to white occurs with an arbitrary amplitude to produce a second differentiation signal. The second differentiation signal from the slice circuit and the R, G and B signals supplied from the input terminals are added by addition circuits to effect contour correction of the R, B and G signals. A CRT is driven by the R, G and B signals for which contour correction has been performed.

11 Claims, 10 Drawing Sheets

APERTURE COMPENSATION CIRCUIT AND RGB MONITOR

BACKGROUND OF THE INVENTION

This invention relates to a aperture compensation circuit and an RGB monitor.

An RGB monitor to which R, G and B signals are inputted so that a color image can be monitored is well known. In an RGB monitor for a personal computer, in order to give the first priority to the picture quality of displayed characters of word processor or spreadsheet software, efforts in the designing of a video circuit are directed to make the frequency characteristic as flat as possible. By the flattening processing of the frequency characteristic, the overshoot after character displaying is suppressed so that peaking does not stand out.

By the way, in recent personal computers, fetching of an image such as a photograph or moving pictures called multimedia image is performed popularly. However, an ordinary RGB monitor has a problem in that, when displaying a multimedia image including a photograph or moving pictures, since it is lower in sharpness than that of a television set for home use, the picture quality is such that a fine contour portion of a display image is not clear-cut and gives a somewhat dull impression.

Further, if, in order to solve the problem described above, sharpness circuits are inserted individually for input R, G and B signals, then another problem arises that, since a phenomenon that an overshoot portion does not become white but is colored occurs depending upon the input color conditions, this is not usually acceptable. Further, in this instance, also another problem occurs that the circuit is complicated and matching in peaking among R, G and B is difficult because of a dispersion of parts.

SUMMARY OF THE INVENTION

It is an object of the present invention to provide a aperture compensation circuit which provides a raised picture quality when a multimedia image is displayed and an RGB monitor having such an aperture compensation circuit.

In order to attain the object described above, according to an aspect of the present invention, there is provided an aperture compensation circuit, comprising detection means for detecting a particular signal from among an R signal, a G signal and a B signal supplied thereto, differentiation means for producing a differentiation signal of the particular signal, and addition means for adding the differentiation signal to the R signal, the G signal and the B signal.

With the aperture compensation circuit, since the sharpness rises when a multimedia image such as a photograph or moving picture is displayed on an RGB monitor in which the aperture compensation circuit is incorporated, a picture quality higher than that of a television set for home use can be obtained. Further, since a common contour correction signal is added to R, G and B signals, from any pattern, an overshoot portion is free from a coloring phenomenon and a picture quality very usually acceptable can be obtained. Furthermore, since the amplitude of the overshoot amount at a character displaying portion is limited, even for a multimedia image in which the character displaying portion is present in a mixed condition, optimum contour correction for the entire screen can be performed without deteriorating the picture quality of the character displaying portion remarkably. Further, the circuit construction is simplified compared with an alternative case wherein individual aperture compensation circuits are provided for R, G and B signals, and matching in peaking among the R, G and B signals can be performed readily when contour correction for the R, G and B signals is performed.

According to another aspect of the present invention, there is provided an RGB monitor to which an R signal, a G signal and a B signal are inputted, comprising detection means for detecting a particular signal from among an R signal, a G signal and a B signal inputted to the RGM monitor, differentiation means for producing a differentiation signal of the particular signal, addition means for adding the differentiation signal to the R signal, the G signal and the B signal to effect contour correction, and a CRT connected to be driven by the R signal, G signal and B signal for which the contour correction has been performed.

With the RGB monitor, since it incorporates the aperture compensation circuit according to the present invention described above, similar advantages to those described above can be achieved.

The above and other objects, features and advantages of the present invention will become apparent from the following description and the appended claims, taken in conjunction with the accompanying drawings in which like parts or elements are denoted by like reference characters.

DESCRIPTION OF THE PREFERRED EMBODIMENTS

Figure 1:
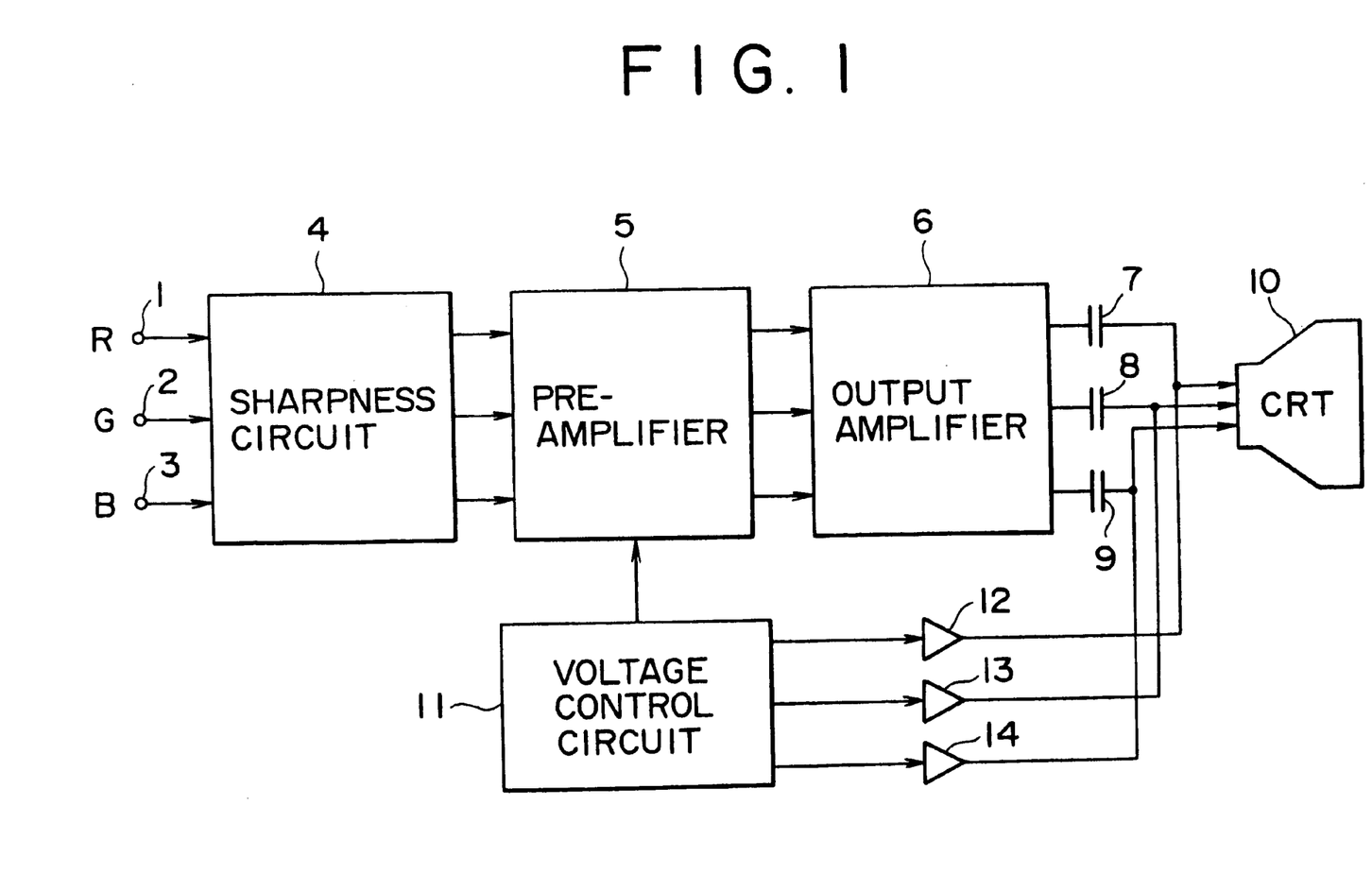
FIG. 1 is a block diagram showing an example of a construction of an RGB monitor according to a first preferred embodiment of the present invention.

Referring first to FIG. 1, there is shown in block diagram form an RGB monitor according to a first preferred embodiment of the present invention. In the RGB monitor shown, input terminals 1 to 3 of R, G and B signals are connected to input terminals for R, G and B signals of a sharpness circuit 4a, respectively. Output terminals for R, G and B signals of the sharpness circuit 4a are connected to input terminals for R, G and B terminals of a preamplifier 5, respectively. Output terminals for R, G and B signals of the preamplifier 5 are connected to input terminals for R, G and B signals of an output amplifier 6, respectively. Output terminals for R, G and B signals of the output amplifier 6 are connected to cathodes (not shown) for R, G and B of a cathode ray tube (CRT) 10 through capacitors 7 to 9, respectively. A voltage control circuit 11 is connected to the preamplifier 5 and connected also to the cathodes for R, G and B of the CRT 10 through amplifiers 12 to 14, respectively.

In the RGB monitor shown in FIG. 1, R, G and B signals are supplied to the input terminals 1 to 3, respectively. Further, though not shown, a horizontal synchronizing signal and a vertical synchronizing signal, or a composite synchronizing signal, is supplied to the RGB monitor. The R, G and B signals from the input terminals 1 to 3 are supplied to the sharpness circuit 4. The sharpness circuit 4 performs contour correction for all of the R, G and B signals based on a signal detected in accordance with a predetermined condition from among the R, G and B signals. A detailed construction of the sharpness circuit 4 will be hereinafter described.

The R, G and B signals contour corrected by the sharpness circuit 4 are supplied to the preamplifier 5. The preamplifier 5 performs signal processing of the R, G and B signals supplied thereto under the control of the voltage control circuit 11 to adjust the contrast, the black level and so forth of them. The R, G and B signals processed by the preamplifier 5 are supplied to the output amplifier 6, and the cathodes of the CRT 10 are driven by R, G and B signals outputted from the output amplifier 6 through the capacitors 7 to 9, respectively. In the CRT 10, the cutoff levels are adjusted in accordance with control signals supplied thereto from the voltage control circuit 11 through the amplifiers 12 to 14.

In the RGB monitor, since input R, G and B signals are contour corrected by the sharpness circuit 4, the contour of an image formed on the CRT 10 is emphasized, and consequently, a clear-cut image is obtained. Here, the sharpness circuit 4 employed in the RGB monitor detects that one of inputted R, G and B signals which has the smallest amplitude, and performs contour correction of the R, G and B signals based on the detected signal. In the following, details of the sharpness circuit 4 are described with reference to FIG. 2 which shows in block diagram an example of a construction of the sharpness circuit 4 employed in the RGB monitor of FIG. 1.

Figure 2:
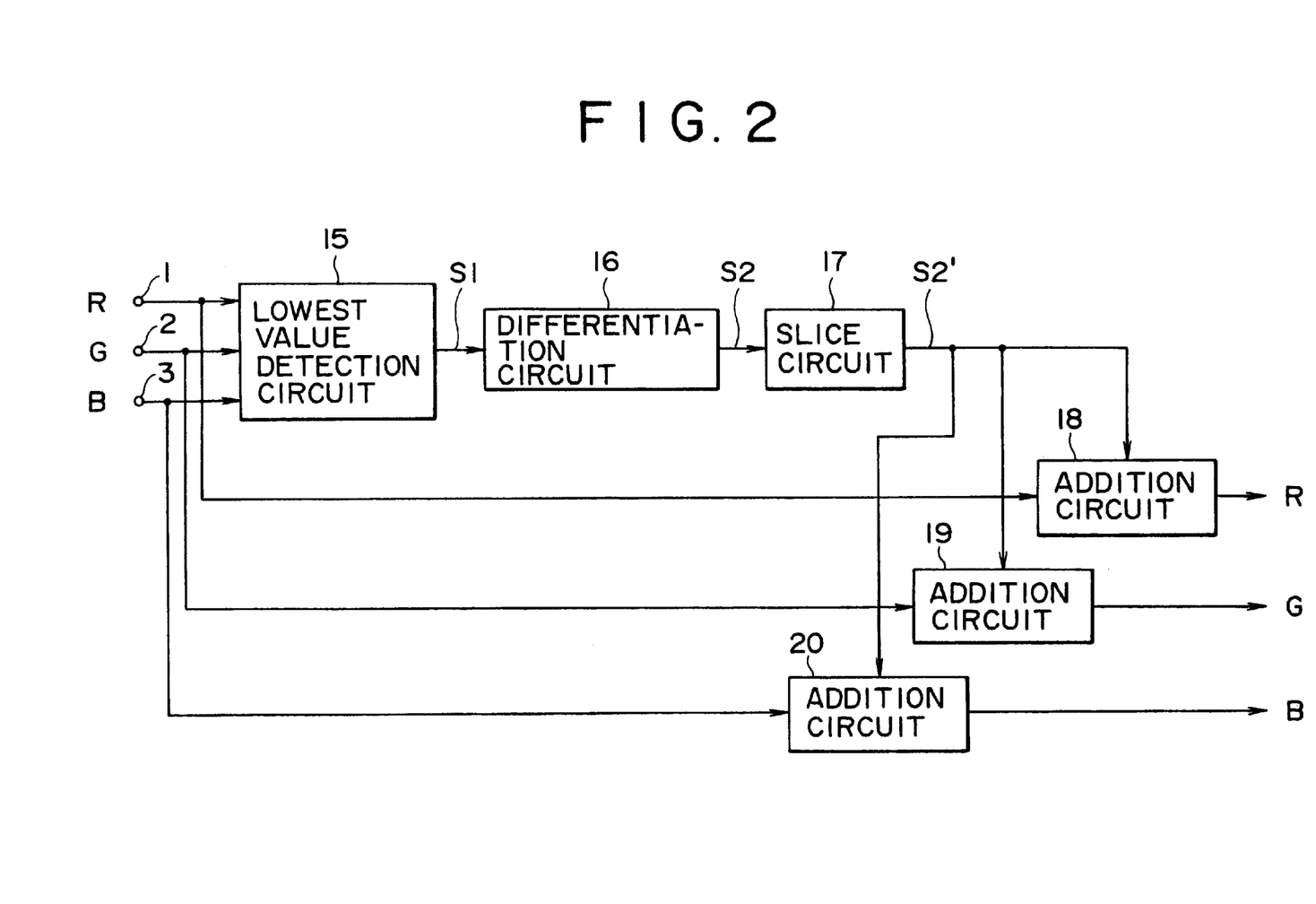
FIG. 2 is a block diagram showing an example of a construction of a sharpness circuit employed in the RGB monitor of FIG. 1.

As shown in FIG. 2, the sharpness circuit 4 employed in the RGB monitor of FIG. 1 includes a lowest value detection circuit 15, a differentiation circuit 16, a slice circuit 17 and addition circuits 18 to 20. The input terminals 1 to 3 are connected to input terminals for R, G and B signals of the lowest value detection circuit 15 and each connected to one of a pair of input terminals of a corresponding one of the addition circuits 18 to 20. An output terminal of the lowest value detection circuit 15 is connected to an input terminal of the differentiation circuit 16, and an output terminal of the differentiation circuit 16 is connected to an input terminal of the slice circuit 17. An output terminal of the slice circuit 17 is connected to the other input terminals of the addition circuits 18 to 20. Output terminals of the addition circuits 18 to 20 are connected to input terminals (not shown) for R, G and B signals of the preamplifier 5, respectively.

Figure 3:
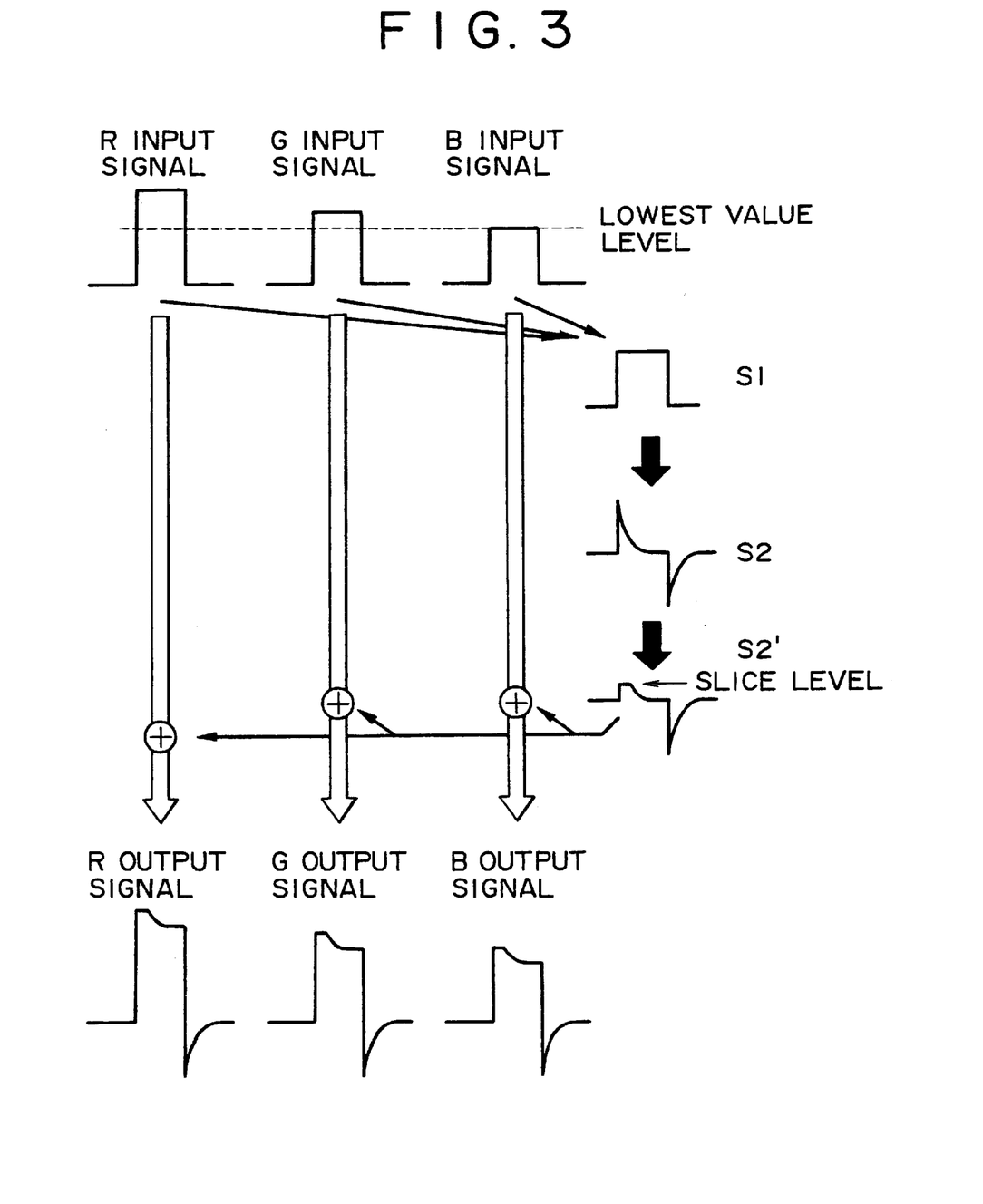
FIG. 3 is a timing chart illustrating operation of the sharpness circuit of FIG. 2.

Here, operation of the sharpness circuit 4 is described below with reference to FIG. 3 which illustrates in time chart operation of the sharpness circuit 4.

In particular, R, G and B signals from the input terminals 1 to 3 are supplied to the lowest value detection circuit 15 and also to the addition circuits 18 to 20, respectively. Here, it is assumed that the voltages of pedestal portions of the input R, G and B signals are equal among the R, G and B signals. The lowest value detection circuit 15 detects, from among the R, G and B signals supplied thereto, a signal which has the smallest amplitude, and outputs the signal as a lowest value signal S1. This lowest value signal S1 is near to a brightness signal of a television signal. Further, the lowest value detection circuit 15 is constructed so that it can detect, from within any input signals which vary momentarily, an input signal of the smallest amplitude momentarily. Where such R, G and B signals as seen in FIG. 3 are received, the B signal which has the smallest amplitude from among the R, G and B signals is outputted as the lowest value signal S1.

The lowest value signal S1 from the lowest value detection circuit 15 is supplied to the differentiation circuit 16. The differentiation circuit 16 differentiates the lowest value signal S1 to produce a differentiation signal S2. This differentiation signal S2 corresponds to an edge component of the lowest value signal S1. The differentiation signal S2 from the differentiation circuit 16 is supplied to the addition circuits 18 to 20 through the slice circuit 17. In this instance, a component of the differentiation signal S2 which corresponds to a portion at which a change from black to white occurs is sliced with an arbitrary amplitude by the slice circuit 17.

The differentiation signal S2' after slice processed by the slice circuit 17 is supplied as a contour correction signal to the addition circuits 18 to 20. The addition circuits 18 to 20 add, to the original R, G and B signals from the input terminals 1 to 3 supplied to the first terminals thereof, the differentiation signal S2' from the slice circuit 17 supplied to the second input terminals thereof. Consequently, contour corrected R, G and B signals having a desired sharpness characteristic are produced. The contour corrected R, G and B signals are supplied from the output terminals of the addition circuits 18 to 20 to the input terminals for R, G and B signals of the preamplifier 5, respectively, and signal processed by the preamplifier 5, and then supplied to the output amplifier 6. Then, the cathodes of the CRT 10 are driven by the contour corrected R, G and B signals.

Figure 4:
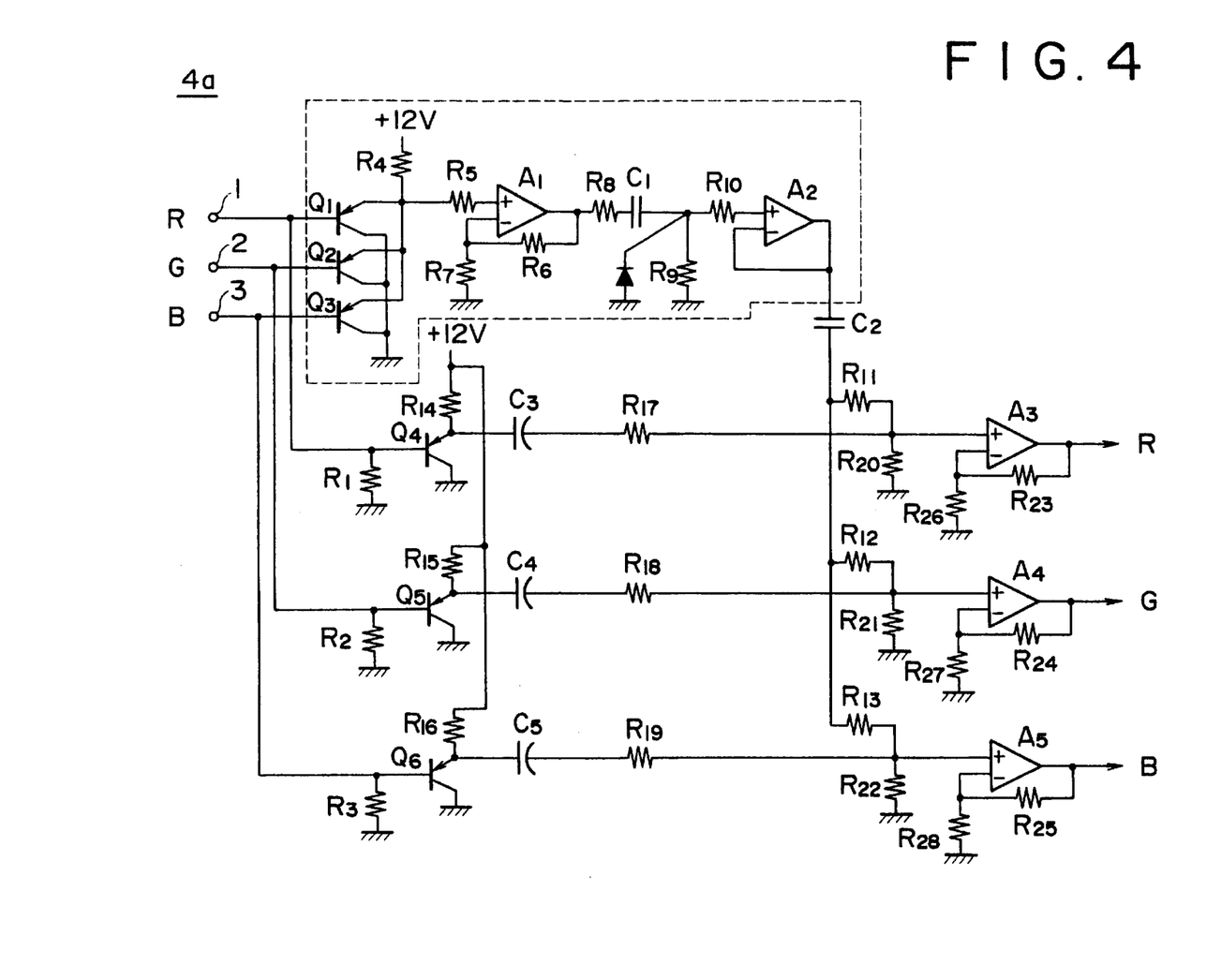
FIG. 4 is a circuit diagram showing a detailed structure of the sharpness circuit of FIG. 2.

FIG. 4 shows in circuit diagram an exemplary detailed construction of the sharpness circuit 4a of FIG. 2. Referring to FIG. 4, the input terminals 1 to 3 are connected to the bases of transistors $Q_1$ to $Q_3$ and also to the bases of transistors $Q_4$ to $Q_6$, respectively. Further, the input terminals 1 to 3 are grounded through resistors $R_1$ to $R_3$, respectively.

The collectors and the emitters of the transistors $Q_1$ to $Q_3$ are individually connected commonly. The commonly connected collectors of the transistors $Q_1$ to $Q_3$ are grounded, and the commonly connected emitters are connected to a power supply (not shown), which supplies a power supply voltage of +12 V, through a resistor $R_4$. The lowest value detection circuit 15 in FIG. 2 is formed from the transistors $Q_1$ to $Q_3$. The commonly connected emitters of the transistors $Q_1$ to $Q_3$ which form the lowest value detection circuit 15 are connected to a non-negated input terminal of an operational amplifier $A_1$, which acts as an amplifier, through a resistor $R_5$.

An output terminal of the operational amplifier $A_1$ is connected to a negated input terminal of the operational amplifier $A_1$ through a resistor $R_6$, and a junction between the resistor $R_6$ and the negated input terminal of the operational amplifier $A_1$ is grounded through a resistor $R_7$. An output terminal of the operational amplifier $A_1$ is connected to a terminal of a capacitor $C_1$ through a resistor $R_8$. The other terminal of the capacitor $C_1$ is grounded through a resistor $R_9$. The capacitor $C_1$ and the resistor $R_9$ form a CR resonance circuit, and the differentiation circuit 16 in FIG. 2 is formed from the CR resonance circuit. The time constant of the CR resonance circuit formed from the capacitor $C_1$ and the resistor $R_9$ can be varied when necessary. A diode $D_1$ is connected at the cathode terminal thereof to a junction between the capacitor $C_1$ and the resistor $R_9$, and the anode terminal of the diode $D_1$ is grounded. The slice circuit 17 in FIG. 2 is formed from the diode $D_1$.

The common junction of the capacitor $C_1$, the resistor $R_9$ and the cathode terminal of the diode $D_1$ is connected to a non-negated input terminal of an operational amplifier $A_2$, which acts as a buffer, through a resistor $R_{10}$. An output terminal of the operational amplifier $A_2$ is connected to a negated input terminal of the operational amplifier $A_2$ and connected to one of a pair of terminals of each of resistors $R_{11}$ to $R_{13}$ through a capacitor $C_2$. The other terminals of the resistors $R_{11}$ to $R_{13}$ are connected to non-negated input terminals of operational amplifiers $A_3$ to $A_5$, respectively.

Transistors $Q_4$ to $Q_6$ connected at the bases thereof to the input terminals 1 to 3, respectively, form emitter follower circuits which act as buffers. The collectors of the transistors $Q_4$ to $Q_6$ are grounded. The emitters of the transistors $Q_4$ to $Q_6$ are connected to the power supply (not shown) of +12 V through resistors $R_{14}$ to $R_{16}$, respectively. The emitters of the transistors $Q_4$ to $Q_6$ are connected to first terminals of resistors $R_{17}$ to $R_{19}$ through capacitors $C_3$ to $C_5$, respectively. The other or second terminals of the resistors $R_{17}$ to $R_{19}$ are connected to non-negated input terminals of the operational amplifiers $A_3$ to $A_5$, respectively.

The addition circuit 18 in FIG. 2 is formed from the operational amplifier $A_3$ and the resistors $R_{11}$ and $R_{17}$. The addition circuit 19 in FIG. 2 is formed from the operational amplifier $A_4$ and the resistors $R_{12}$ and $R_{18}$. The addition circuit 20 in FIG. 2 is formed from the operational amplifier $A_5$ and the resistors $R_{13}$ and $R_{19}$.

The common junction of the non-negated input terminal of the operational amplifier $A_3$ and the resistors $R_{11}$ and $R_{17}$ is grounded through a resistor $R_{20}$. The common junction of the non-negated input terminal of the operational amplifier $A_4$ and the resistors $R_{12}$ and $R_{18}$ is grounded through a resistor $R_{21}$. The common junction of the non-negated input terminal of the operational amplifier $A_5$ and the resistors $R_{13}$ and $R_{19}$ is grounded through a resistor $R_{22}$. Output terminals of the operational amplifiers $A_3$ to $A_5$ are connected to the non-negated input terminals of the operational amplifiers $A_3$ to $A_5$ through resistors $R_{23}$ to $R_{25}$, respectively, and the junctions of the resistors $R_{23}$ to $R_{25}$ and the non-negated input terminals of the operational amplifiers $A_3$ to $A_5$ are grounded through resistors $R_{26}$ to $R_{28}$, respectively. Output terminals of the operational amplifiers $A_3$ to $A_5$ are connected to the input terminals for R, G and B signals of the preamplifier 5 not shown.

Here, for the transistors $Q_1$ to $Q_6$, for example, a pnp type bipolar transistor is used. Further, for the operational amplifier $A_1$ to $A_5$, an operational amplifier having a sufficiently high radio frequency characteristic is used.

R, G and B signals from the input terminals 1 to 3 are supplied to the bases of the transistors $Q_1$ to $Q_3$ which form the lowest value detection circuit and the bases of the transistors $Q_4$ to $Q_6$ which form emitter follower circuits for buffering, respectively.

By the transistors $Q_1$ to $Q_3$ which form the lowest value detection circuit, a lowest value signal S1 is detected from among the R, G and B signals from the input terminals 1 to 3. The lowest value signal S1 is suitably amplified by the operational amplifier $A_1$ and then supplied to the differentiation circuit formed from the CR resonance circuit of the capacitor $C_1$ and the resistor $R_9$. By the differentiation circuit, a differentiation signal S2 of the lowest value signal S1 is produced. The differentiation signal S2 is subject to predetermined slice processing by the diode $D_1$ provided at the input portion of the operational amplifier $A_2$ for buffering in the next stage. A differentiation signal S2' after the slice processing has been performed is supplied to the operational amplifier $A_2$. From the operational amplifier $A_2$, the differentiation signal S2' is buffer outputted. Meanwhile, from the transistors $Q_4$ to $Q_6$ which form emitter followers, the R, G and B signals supplied from the input terminals 1 to 3 are buffer outputted, respectively.

The differentiation signal S2' buffer outputted from the operational amplifier $A_2$ is resistance added to the R, G and B signals buffer outputted from the transistors $Q_4$ to $Q_6$ through the corresponding resistors $R_{11}$ to $R_{13}$ and $R_{17}$ to $R_{19}$, respectively. The operational amplifiers $A_3$ to $A_5$ in the next stage effect suitable amplification where they have insufficient amplitudes.

According to the RGB monitor of the first embodiment having the construction described above, since it includes the sharpness circuit 4a constructed so as to detect a lowest value signal S1 from among input R, G and B signals and effect contour correction for all of the R, G and B signals based on a differentiation signal S2 obtained by differentiating the lowest value signal S1, the sharpness of a color image displayed on the CRT 10 is improved, and a picture quality higher than that of a television monitor can be obtained when the CRT 10 displays a photograph or moving pictures. Further, since, from any pattern, no coloring phenomenon occurs at an overshoot portion, a picture quality very usually acceptable can be obtained.

Further, by performing contour correction of the R, G and B signals using a differentiation signal S2' obtained by slicing a component of the differentiation signal S2 corresponding to a portion at which a change from black to white occurs with an arbitrary amplitude, the amplitude of the overshoot amount at a character displaying portion is limited. consequently, even for a pattern wherein a character displaying portion is present in a mixed state in a photograph or moving pictures, optimum contour correction of the entire screen can be performed without deteriorating the picture quality of the character displaying portion remarkably.

Further, in the present RGB monitor, since the sharpness circuit 4a is constructed so as to perform contour correction of all of R, G and B signals based on a differentiation signal S2 obtained by differentiating a lowest value detection signal S1 detected from among the input R, G and B signals, simplification in circuit construction can be achieved and matching in peaking among the R, G and B signals can be facilitated compared with an alternative case wherein sharpness circuits are individually provided for R, G and B signals.

Subsequently, a second embodiment of the present invention is described. Usually, it is considered that preferably a contour correction signal used for contour correction in a sharpness circuit is a quadratic differentiation signal. Accordingly, in the present second embodiment, a sharpness circuit which uses a quadratic differentiation signal is described. An RGB monitor according to the second embodiment is constructed in a similar manner, for example, to the RGB monitor according to the first embodiment shown in FIG. 1. However, a sharpness circuit 4b employed in the RGB monitor according to the second embodiment is constructed such that the differentiation circuit formed from the capacitor $C_1$ and the resistor $R_9$ in the sharpness circuit 4a shown in FIG. 4 is replaced by a quadratic differentiation circuit which employs a delay circuit. In particular, FIG. 5 is a circuit diagram showing an example of the sharpness circuit 4b employed in the RGB monitor according to the second embodiment.

Figure 5:
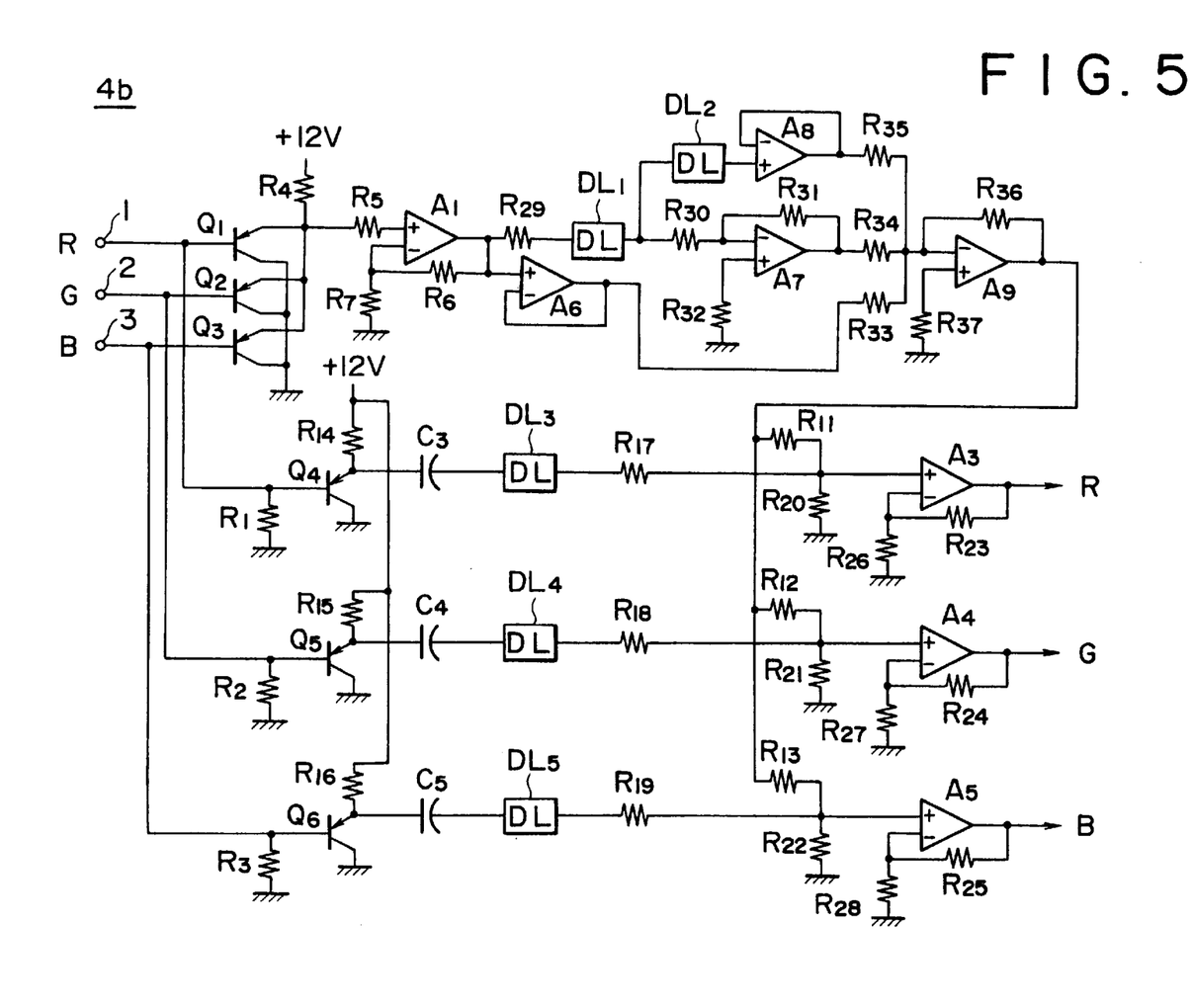
FIG. 5 is a circuit diagram showing a detailed construction of a sharpness circuit used with an RGB monitor according to a second preferred embodiment of the present invention.

Referring to FIG. 5, in the sharpness circuit 4b shown, an output terminal of an operational amplifier $A_1$ is connected to a non-negated input terminal of an operational amplifier $A_6$ which acts as a buffer, and is connected to an input terminal of a delay circuit $DL_1$ through a resistor $R_{29}$. An output terminal of the delay circuit $DL_1$ is connected to a negated input terminal of an operational amplifier $A_7$ for reversal through a resistor $R_{30}$, and is connected also to a non-negated input terminal of an operational amplifier $A_8$ for buffering through another delay circuit $DL_2$. Outputs of the operational amplifiers $A_6$ and $A_8$ are connected to negated input terminals of the operational amplifiers $A_6$ and $A_8$, respectively. An output terminal of the operational amplifier $A_7$ is connected to a non-negated input terminal of the operational amplifier $A_7$ through a resistor $R_{31}$, and a non-negated input terminal of the operational amplifier $A_7$ is grounded through a resistor $R_{32}$. Here, for the delay circuits $DL_1$ and $DL_2$, delay circuits having an equal delay time are used.

Output terminals of the operational amplifiers $A_6$ to $A_8$ are connected to a negated input terminal of an operational amplifier $A_9$ for reversal. An output terminal of the operational amplifier $A_9$ is connected through a feed back resistor $R_{36}$ to a negated input terminal of the operational amplifier $A_9$. A non-negated input terminal of the operational amplifier $A_9$ is grounded through a resistor $R_{37}$. The output terminal of the operational amplifier $A_9$ is connected to non-negated input terminals of the operational amplifiers $A_3$ to $A_5$ through the resistors $R_{11}$ to $R_{13}$ for addition.

The emitters of the transistors $Q_4$ to $Q_6$ are connected to input terminals of delay circuits $DL_3$ to $DL_5$ through capacitors $C_3$ to $C_5$, respectively. Output terminals of the delay circuits $DL_3$ to $DL_5$ are connected to non-negated input terminals of the operational amplifiers $A_3$ to $A_5$ through the resistors $R_{17}$ to $R_{19}$ for addition, respectively. In this instance, for the delay circuits $DL_3$ to $DL_5$, delay circuits having a delay time equal to the delay of the delay circuits $DL_1$ and $DL_2$ are used. The remaining part of the sharpness circuit $4b$ is constructed in a similar manner as in the sharpness circuit $4a$ shown in FIG. 4.

Figure 6A:
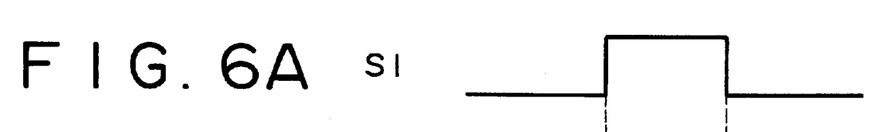
FIGS. 6A–6F are waveform diagrams illustrating operation of the sharpness circuit of FIG. 5.
Figure 6B:
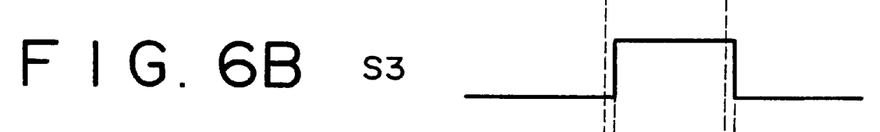
Figure 6C:
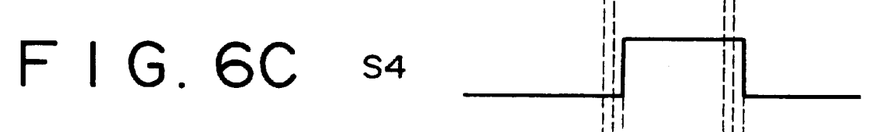
Figure 6D:
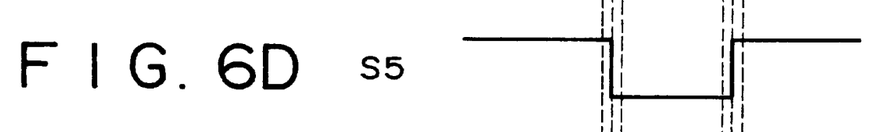
Figure 6E:
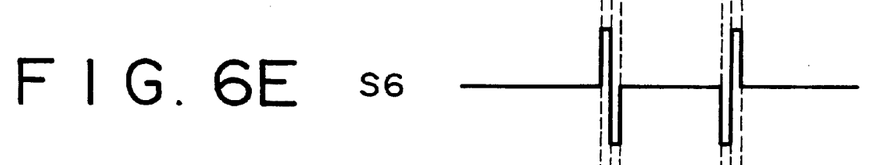
Figure 6F:
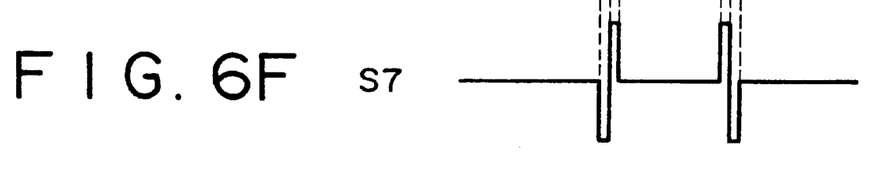

FIG. 6A–6F are waveform diagrams for explaining operation of the sharpness circuit $4b$ shown in FIG. 5. Referring to FIG. 6A, the waveform illustrates the lowest value signal S1 at the output terminal of the operational amplifier $A_1$; the waveform of FIG. 6B illustrates a signal S3 at the output terminal of the delay circuit $DL_1$; the waveform of FIG. 6C illustrates a signal S4 at the output terminal of the delay circuit $DL_2$; the waveform 6D illustrates a signal S5 at the output terminal of the operational amplifier $A_7$; the waveform of FIG. 6E illustrates a signal S6 at the common junction of the resistors $R_{33}$ to $R_{35}$; and the waveform of FIG. 6F illustrates a signal (quadratic differentiation signal) S7 at the output terminal of the operational amplifier $A_9$.

In the sharpness circuit $4b$, from the lowest value detection circuit formed from the transistors $Q_1$ to $Q_3$, such a lowest value signal S1 as seen from the waveform of FIG. 6A is outputted through the operational amplifier $A_1$. The lowest value signal S1 is supplied to the operational amplifier $A_6$ for buffering and supplied also to the delay circuit $DL_1$ through the resistor $R_{29}$. The delay circuit $DL_1$ produces a signal S3 delayed by a time t from the lowest value signal S1 as seen from the waveform of FIG. 6B. The signal S3 from the delay circuit $DL_1$ is supplied to the operational amplifier $A_7$ for reversal through the resistor $R_{30}$ and is supplied to the delay circuit $DL_2$. The delay circuit $DL_2$ produces a signal S4 delayed by the time t from the signal S3 as seen from the waveform of FIG. 6C. The signal S4 from the delay circuit $DL_2$ is supplied to the operational amplifier $A_8$ for buffering.

From the operational amplifier $A_6$, the lowest value signal S1 from the operational amplifier $A_1$ is buffer outputted. From the operational amplifier $A_7$, a signal S5 obtained by reversing the signal S3 from the delay circuit $DL_1$ as seen from the waveform D is outputted. From the operational amplifier $A_9$, the signal S4 from the delay circuit $DL_2$ is buffer outputted. The lowest value signal S1 and the signals S5 and S4 are added through the resistors $R_{33}$ to $R_{35}$, respectively. Consequently, such a signal S6 as seen from the waveform of FIG. 6E is produced. This signal S6 is supplied to the operational amplifier $A_9$. Then, since the signal S6 is reversed by the operational amplifier $A_9$, such a quadratic differentiation signal S7 as a contour correction signal as seen from the waveform of FIG. 6F is produced. This quadratic differentiation signal S7 corresponds to an edge component of the lowest value signal S1.

The quadratic differentiation signal S7 outputted from the operational amplifier $A_9$ is resistance added through the corresponding resistors $R_{11}$ to $R_{13}$ and $R_{17}$ to $R_{19}$ to the R, G and B signals buffer outputted through the delay circuits $DL_3$ to $DL_5$ from the transistors $Q_4$ to $Q_6$ which form emitter follower circuits, respectively. Description of the other operation is omitted here since it is similar to that of the sharpness circuit $4a$ employed in the RGB monitor according to the first embodiment. According to the second embodiment, similar effects to those of the first embodiment can be obtained.

Figure 7:
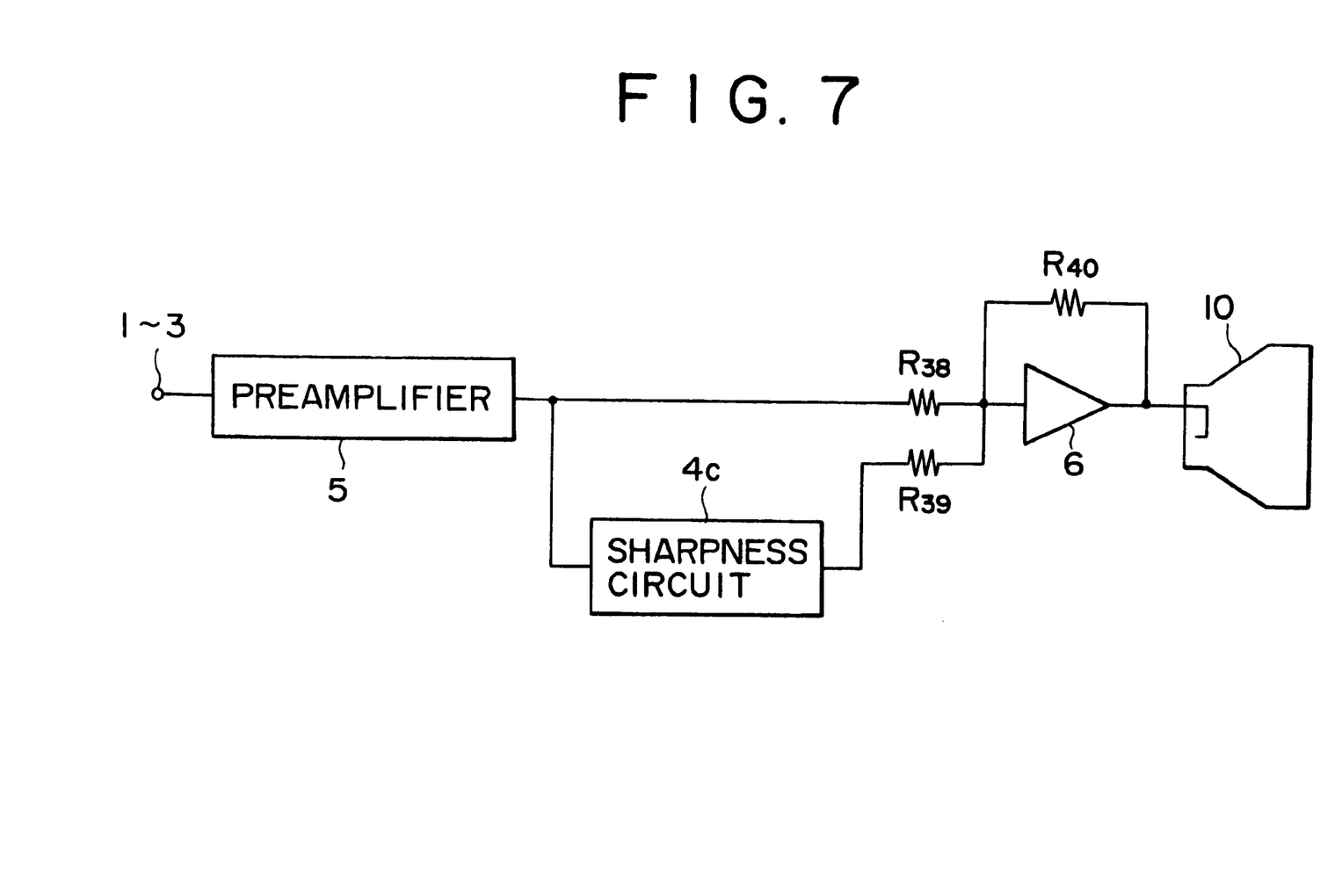
FIG. 7 is a block diagram showing an example of a construction of an RGB monitor according to a third preferred embodiment of the present invention.

Subsequently, a third embodiment of the present invention is described. FIG. 7 is a block diagram showing an example of a construction of an RGB monitor according to the third embodiment. Referring FIG. 7, in the RGB monitor according to the third embodiment, input terminals 1 to 3 for R, G and B signals are connected to input terminals of a preamplifier 5. Output terminals of the preamplifier 5 are connected to input terminals of an output amplifier 6 through resistors $R_{38}$ and connected to input terminals of a sharpness circuit $4c$. Output terminals of the sharpness circuit $4c$ are connected to input terminals of the output amplifier 6 through resistors $R_{39}$. Output terminals of the output amplifier 6 are connected to input terminals of the output amplifier 6 through resistors $R_{40}$ and connected to cathodes of a CRT 10.

Figure 8:
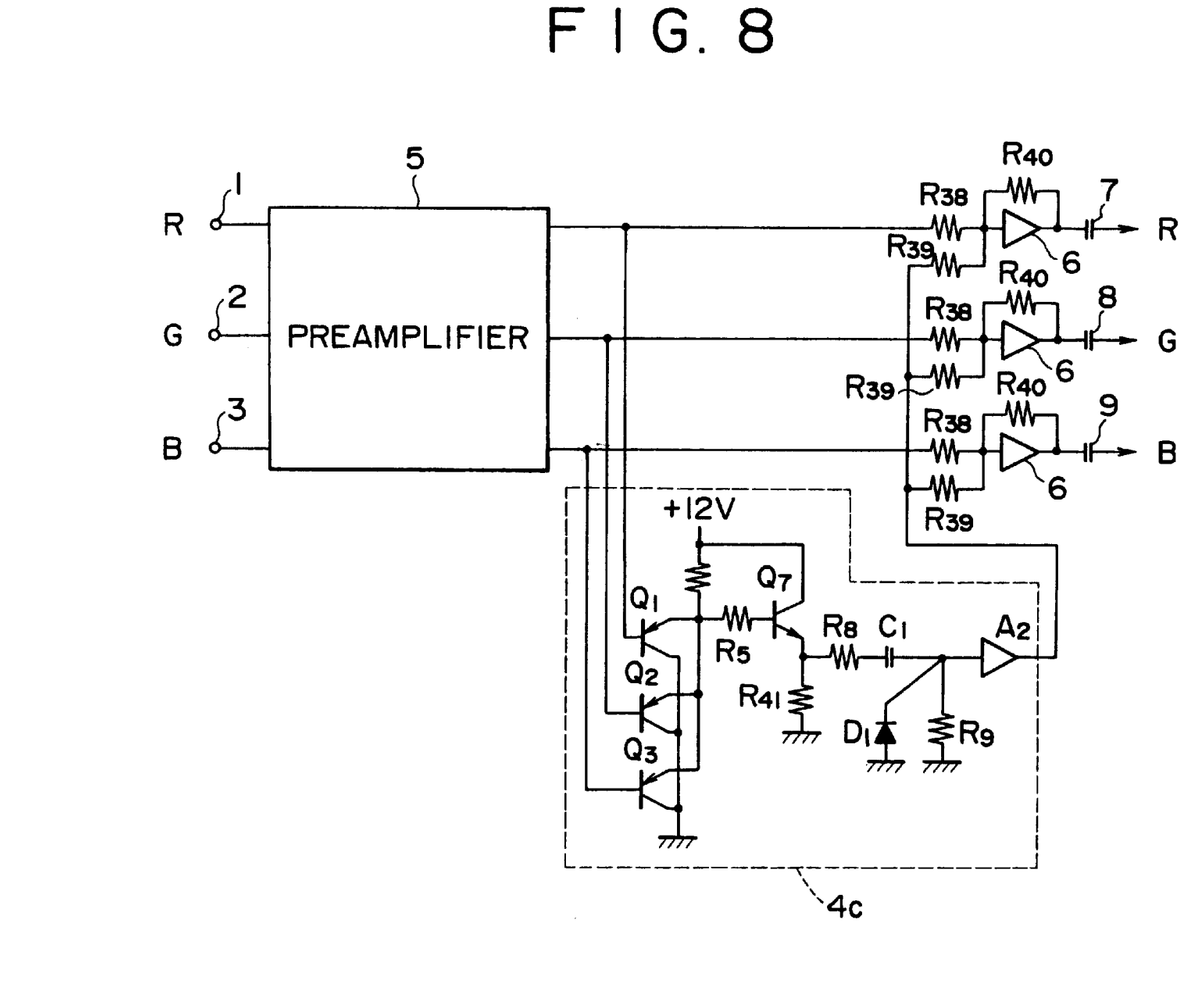
FIG. 8 is a circuit diagram showing a detailed construction of a sharpness circuit shown in FIG. 7.

FIG. 8 is a circuit diagram showing an exemplary detailed construction of the sharpness circuit $4c$ employed in the RGB monitor shown in FIG. 7. Referring to FIG. 8, the output terminals for R, G and B signals of the preamplifier 5 are connected to the input terminals for R, G and B signals of the sharpness circuit $4c$ and connected to the input terminals of the output amplifier 6 for R, G and B signals through the resistors $R_{38}$, respectively.

In this instance, the sharpness circuit $4c$ is constructed in a similar manner to that portion surrounded by a broken line in FIG. 4 of the first embodiment, that is, a portion which forms the lowest value detection circuit, differentiation circuit and slice circuit. The bases of the transistors $Q_1$ to $Q_3$ which form the lowest value detection circuit are connected to the output terminals for R, G and B signals of the preamplifier 5, respectively. Further, the operational amplifier $A_1$ for amplification in FIG. 4 is replaced by the transistor $Q_7$ which forms an emitter follower circuit. For the transistor $Q_7$, an npn type bipolar transistor may be used. The collector of the transistor $Q_7$ is connected to a power supply of +12 V. The emitter of the transistor $Q_7$ is grounded through a resistor $R_{41}$ and is connected to the capacitor $C_1$ which forms the differentiation circuit through the resistor $R_8$. An output terminal of the operational amplifier $A_2$ for buffering of the sharpness circuit $4c$ is connected to the input terminals of the output amplifier 6 for R, G and B signals through the resistors $R_{39}$.

The remaining part of the RGM monitor is constructed in a similar manner as in the RGB monitor according to the first embodiment. It is to be noted that, in FIG. 7, the capacitors 7 to 9, voltage control circuit 11 and amplifiers 12 to 14 are omitted. Further, while, in FIG. 7, signal paths are indicated by a single path for simplification, signal paths are actually provided individually for R, G and B signals similarly as in FIG. 1.

In the RGB monitor according to the third embodiment having the construction described above, the sharpness circuit 4c is provided at the following stage to the preamplifier 5 and the output amplifier 6 is formed as the feedback amplification type, and a contour correction signal from the sharpness circuit 4c is added to R, G and B signals from the preamplifier 5 at the input stage of the output amplifier 6.

In this instance, the R, G and B signals from the preamplifier 5 are supplied to the sharpness circuit 4c and also to the output amplifier 6 for R, G and B signals. The sharpness circuit 4c detects a lowest value signal S1 from among the R, G and B signals supplied thereto from the preamplifier 5 and produces a differentiation signal S2' corresponding to an edge portion of the lowest value signal S1. Then, the differentiation signal S2' is supplied as a contour correction signal to the output amplifier 6 for R, G and B signals.

At the input stage of the output amplifier 6 for R, G and B signals, the differentiation signal S2' supplied from the sharpness circuit 4c is resistance added to the R, G and B signals supplied from the preamplifier 5 through respective corresponding ones of the resistors $R_{38}$ and $R_{39}$ so that R, G and B signals having a desired sharpness characteristic are produced. Description of the other operation is omitted since it is similar to that of the first embodiment. According to the present third embodiment, similar effects to those of the first embodiment can be obtained.

Figure 9:
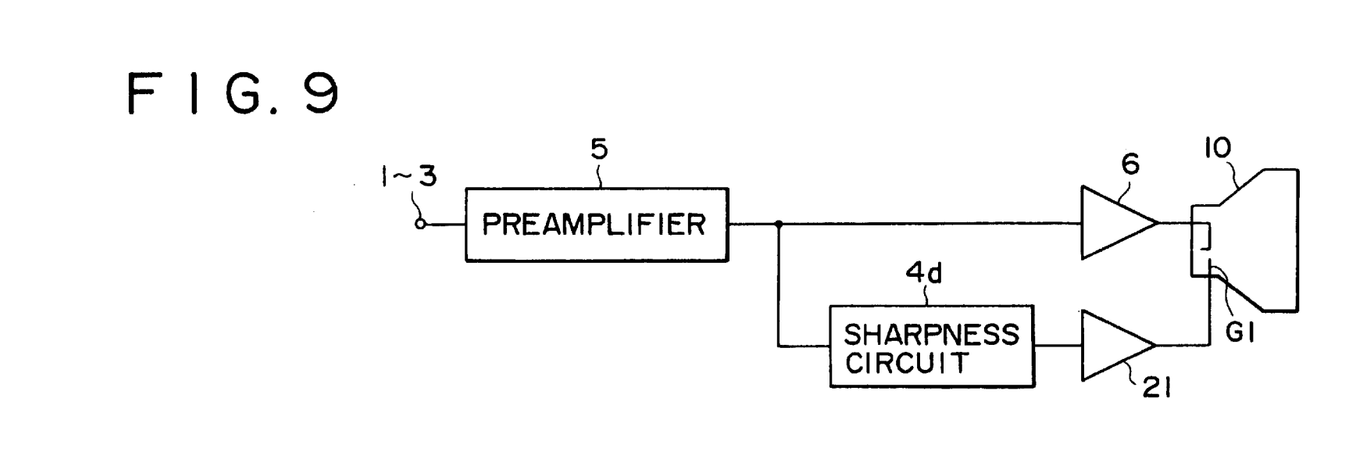
FIG. 9 is a block diagram showing an example of a construction of an RGB monitor according to a fourth preferred embodiment of the present invention.

Subsequently, a fourth embodiment of the present invention is described. FIG. 9 is a block diagram showing an example of a construction of an RGB monitor according to the fourth embodiment. As shown in FIG. 9, in the RGB monitor according to the fourth embodiment, input terminals 1 to 3 are connected to input terminals of the preamplifier 5. Output terminals of the preamplifier 5 are connected to input terminals of an output amplifier 6 and also to input terminals of a sharpness circuit 4d. output terminals of the sharpness circuit 4d are connected to a first grid electrode G1 of a CRT 10 through an amplifier 21.

Figure 10:
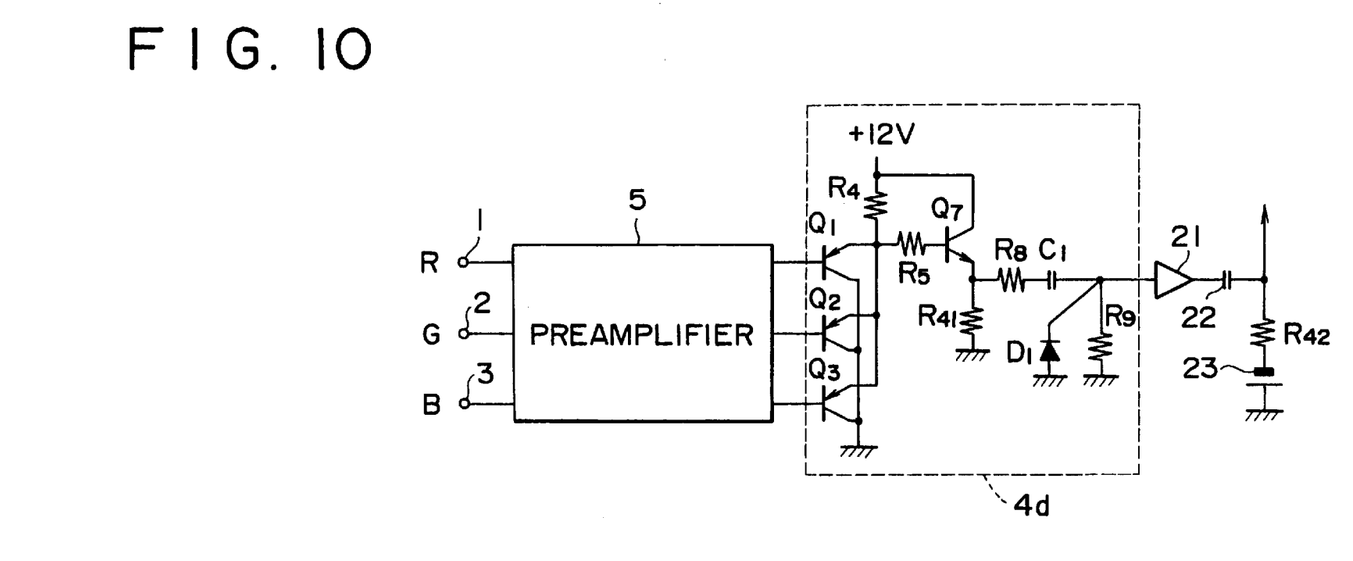
FIG. 10 is a circuit diagram showing a detailed construction of a sharpness circuit shown in FIG. 9.

FIG. 10 is a circuit diagram showing an exemplary detailed construction of the sharpness circuit 4d employed in the RGB monitor shown in FIG. 9. Referring to FIG. 10, the present sharpness circuit 4d is constructed in a similar manner to the sharpness circuit 4c shown in FIG. 8. In this instance, an output terminal of the sharpness circuit 4d, that is, a common junction of a capacitor $C_1$ and a resistor $R_9$ which form a differentiation circuit and a diode $D_1$ which forms a slice circuit, is connected to an input terminal of the amplifier 21. For the amplifier 21, an amplifier similar to the amplifiers (not shown) for R, G and B signals used for the output amplifier 6 is used. An output terminal of the amplifier 21 is connected to the first grid electrode G1 of the CRT 10 through a capacitor 22. A bias power supply 23 for the first grid electrode G1 is connected at the negative pole thereof to the first grid electrode GI through a resistor $R_{42}$, while the positive pole of the bias power supply 23 is grounded.

The remaining part of the RGB monitor of the fourth embodiment is constructed in a similar manner to the RGB monitor according to the first embodiment. It is to be noted that, in FIG. 9, the capacitors 7 to 9, voltage control circuit 11 and amplifiers 12 to 14 are omitted. Further, while, in FIG. 9, signal paths are indicated by a single path for simplification, signal paths are actually provided individually for R, G and B signals similarly as in FIG. 1.

In the RGB monitor according to the fourth embodiment having the construction described above, the sharpness circuit 4d is provided at the stage following the preamplifier 5 and a contour correction signal (differentiation signal S2') from the sharpness circuit 4d is added to the bias to the first grid electrode G1 of the CRT 10 to effect contour correction of R, G and B signals for driving the cathodes of the CRT 10.

Description of the remaining part of the RGB monitor is omitted here since it is similar to that in the first embodiment. According to the present fourth embodiment, similar effects to those of the first embodiment can be obtained, and another effect that deterioration of R, G and B signals for driving the cathodes of the CRT 10 does not basically occur and a further effect that no influence is had on the dynamic range of the output amplifier 6 can be obtained additionally.

Subsequently, a fifth embodiment of the present invention is described. An RGB monitor according to the fifth embodiment is constructed in a similar manner, for example, to the RGB monitor according to the first embodiment. In this instance, however, the sharpness circuit 4a is replaced by a sharpness circuit 4e. In particular, FIG. 11 is a block diagram showing an exemplary detailed construction of the sharpness circuit 4e which is employed in the RGB monitor according to the fifth embodiment.

Figure 11:
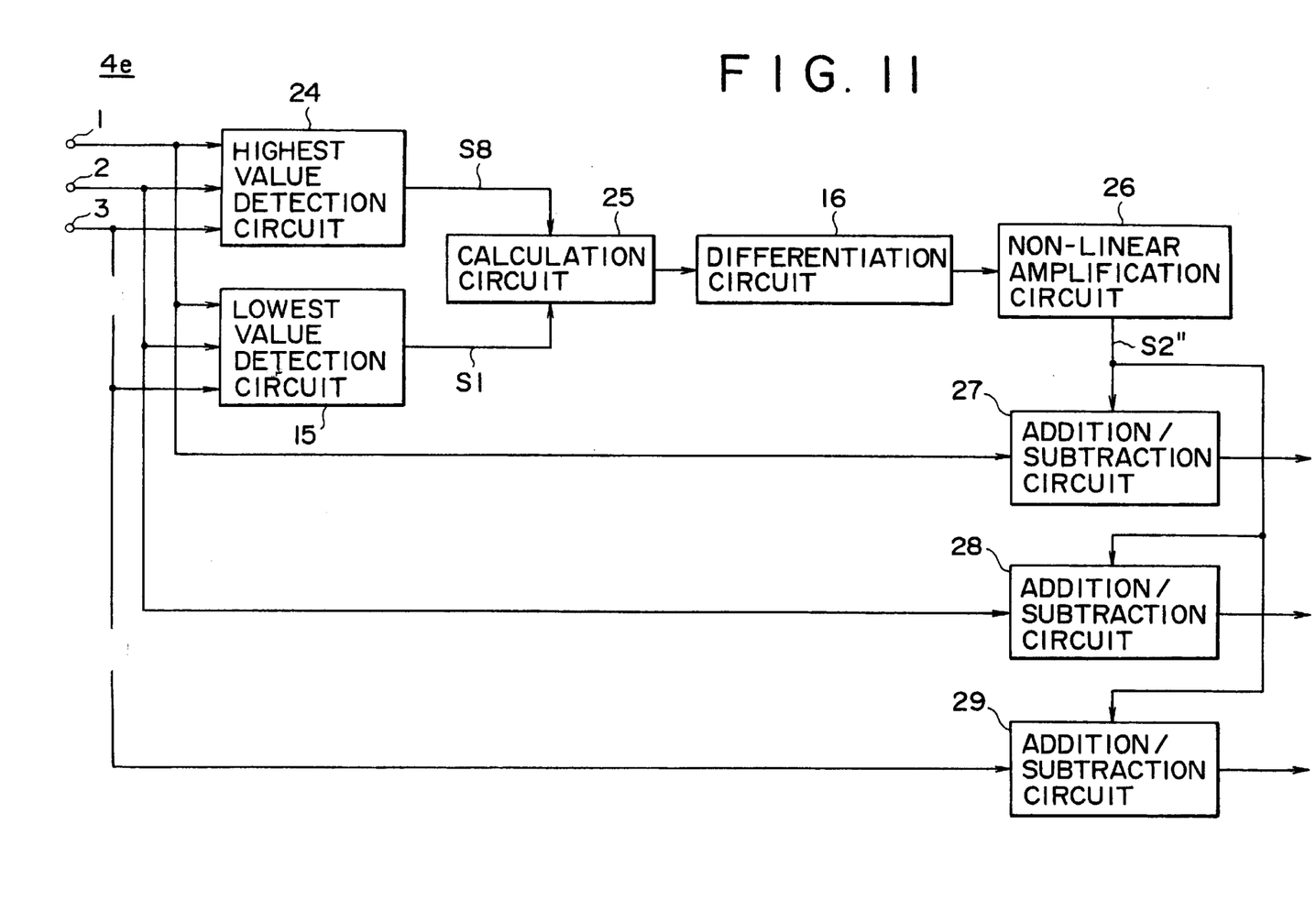
FIG. 11 is a block diagram showing an example of a construction of a sharpness circuit employed in an RGB monitor according to a fifth preferred embodiment of the present invention.

Referring to FIG. 11, the present sharpness circuit 4e includes, in addition to a construction similar to that of the sharpness circuit 4a of the first embodiment, a highest value detection circuit 24 and a calculation circuit 25. Further, the slice circuit 17 in FIG. 2 is replaced by a non-linear amplification circuit 26, and the addition circuits 18 to 20 in FIG. 2 are replaced by addition/subtraction circuits 27 to 29, respectively.

In the sharpness circuit 4e, input terminals for R, G and B signals of the highest value detection circuit 24 are connected to the input terminals 1 to 3, respectively. Meanwhile, output terminals of the lowest value detection circuit 15 and the highest value detection circuit 24 are connected to input terminals of the calculation circuit 25, and an output terminal of the calculation circuit 25 is connected to an input terminal of the differentiation circuit 16.

In this instance, the highest value detection circuit 24 detects, from among R, G and B signals supplied thereto from the input terminals 1 to 3, a signal having the largest amplitude, and outputs the signal as a highest value signal S8. The calculation circuit 25 calculates, for example, when the lowest value signal S1 from the lowest value detection circuit 15 and the highest value signal S8 from the highest value detection circuit 24 are different in amplitude from each other, the sum of or the a difference between them.

The non-linear amplification circuit 26 connected to the differentiation circuit 16 effects such non-linear amplification that, for example, the amplification factor is decreased in a region wherein the amplitude of the differentiation signal S2 from the differentiation circuit 16 is larger, but the amplification factor is increased in another region wherein the amplification factor of the differentiation signal S2 is smaller.

The addition/subtraction circuits 27 to 29 effect addition or subtraction of a differentiation signal S2" supplied thereto from the differentiation circuit 16 through the non-linear amplification circuit 26 to or from the R, G and B signals supplied thereto from the input terminals 1 to 3. Consequently, it is possible not only to emphasize a contour provided by the R, G and B signals but also to de-emphasize a contour provided by the R, G and B signals. Description of the remaining part of the RGB monitor is omitted here because it is similar as in the first embodiment. Also by the fifth embodiment, similar effects to those of the first embodiment can be obtained.

While the embodiments of the present invention are described in detail above, the present invention is not limited to the embodiments described above and various modifications are possible based on the technical spirit of the present invention. For example, the constructions described above in connection with the embodiments are mere examples at all, and the present invention is not limited to the constructions.

Further, for example, in the first to fifth embodiments of the present invention, it is also possible to build in a function of turning the sharpness function of the sharpness circuits 4a to 4e on/off or another function of setting the amount of sharpness to an arbitrary value.

Further, it is also possible to build in a function of automatically varying the amount of sharpness by adding a circuit which detects amplitudes of R, G and B signals or magnitudes of harmonic components in a screen. Further, it is also possible not to perform uniform sharpness processing for an entire display screen but also to build in a function of varying the sharpness amount only at a portion of the screen.

Further, for example, in the first to fifth embodiments described above, even if an optimum peaking frequency varies depending upon the timing (resolution, display format) of a display signal such as in a case wherein the RGB monitor is a multi-scan monitor, it is possible to cope with any signal condition by varying the time constant of the differentiation circuit.

Further, while, in the first to fifth embodiments described above, a case wherein contour correction in a horizontal direction is performed is described, contour correction in a vertical direction may be performed alternatively. For example, a differentiation signal for contour correction in a vertical direction can be formed by modifying the second embodiment described above such that the delay time t of the delay circuits $DL_1$ to $DL_5$ of the sharpness circuit 4b is set to 1 horizontal period.

Having now fully described the invention, it will be apparent to one of ordinary skill in the art that many changes and modifications can be made thereto without departing from the spirit and scope of the invention as set forth herein.

What is claimed is:

1. An aperture compensation circuit comprising:
   detection means receiving an R signal, a G signal and a B signal for detecting a particular quality present in the R signal, the G signal and the B signal and producing an output signal corresponding to said particular quality;
   differentiation means for producing a differentiation signal by differentiating the output signal from said detection means and producing an edge component of the output signal; and
   addition means for adding the differentiation signal to the R signal, to the G signal and to the B signal.

2. The aperture compensation circuit according to claim 1, wherein the particular quality detected from among the R signal, the G signal and the B signal is the smallest amplitude of the R signal, the G signal and the B signal.

3. The aperture compensation circuit according to claim 1, wherein the particular quality detected from among the R signal, the G signal and the B signal is the largest amplitude of the R signal, the G signal and the B signal.

4. The aperture compensation circuit according to claim 1, wherein said differentiation means includes means for performing quadratic differentiation of the output signal from said detection means.

5. The aperture compensation circuit according to claim 1, wherein said detection mean includes a highest value detection circuit and a lowest value detection circuit for respectively detecting a highest value and a lowest value of the R signal, the G signal and the B signal and further comprising calculation means connected to outputs of said highest value detection circuit and said lowest value detection circuit for performing a predetermined calculation thereon and producing an output fed to said diffentiation means.

6. The aperture compensation circuit according to claim 5, further comprising non-linear amplification means connected between said differentiation means and said addition means for non-linearly amplifying the differentiation signal.

7. The aperture compensation circuit according to claim 1, further comprising slice means connected between said differentiation means and said addition means for slicing the differentiation signal with a predetermined amplitude.

8. The aperture compensation circuit according to claim 1, further comprising amplitude control means connected to said differentiation means for controlling an amplitude of the differentiation signal.

9. An RGB monitor to which an R signal, a G signal and a B signal are inputted, comprising:
   detection means for detecting a particular quality present in the R signal, the G signal and the B signal inputted to said RGB monitor and producing an output signal corresponding to the particular quality;
   differentiation means for producing a differentiation signal by differentiating the output signal detected by said detection means and producing an edge component signal of the output signal;
   addition means for adding the differentiation signal to the R signal to the G signal and to the B signal to effect respective contour correction thereof; and
   a CRT connected to be driven by the R signal, the G signal and the B signal for which the contour correction has been performed.

10. An RGB monitor according to claim 9, wherein the particular quality detected from among the R signal, the G signal and the B signal is the smallest amplitude of the R signal, the G signal and the B signal.

11. An RGB monitor according to claim 9, wherein the differentiation signal is used as a bias signal and is connected to a first grid electrode of said CRT, so that when said CRT is driven contour correction of the R signal, the G signal and the B signal is performed.

* * * * *